(12) United States Patent
Hirano

(10) Patent No.: US 6,697,210 B2
(45) Date of Patent: Feb. 24, 2004

(54) DISK DEVICE

(75) Inventor: Shinichi Hirano, Kyoto (JP)

(73) Assignee: Rohm Co., LTD, Kyoto (JP)

( * ) Notice: Subject to any disclaimer, the term of this patent is extended or adjusted under 35 U.S.C. 154(b) by 440 days.

(21) Appl. No.: 09/740,985

(22) Filed: Dec. 21, 2000

(65) Prior Publication Data

US 2001/0005294 A1 Jun. 28, 2001

(30) Foreign Application Priority Data

Dec. 22, 1999 (JP) .......................................... H11-363807
Dec. 22, 1999 (JP) .......................................... H11-363808

(51) Int. Cl.$^7$ ............................................. G11B 5/596
(52) U.S. Cl. ................................ 360/78.04; 360/78.13; 360/61
(58) Field of Search ........................... 360/78.04, 78.13, 360/61, 75

(56) References Cited

U.S. PATENT DOCUMENTS 5,005,089 A * 4/1991 Thanos et al. ........... 360/77.08
5,283,702 A * 2/1994 Tsuyuguchi et al. .......... 360/75
5,434,724 A * 7/1995 Shoji et al. ................... 360/75
5,550,447 A * 8/1996 Sugeta et al. ............... 318/439
5,880,900 A * 3/1999 Okada et al. ................. 360/75

\* cited by examiner

*Primary Examiner*—David Hudspeth
*Assistant Examiner*—K. Wong
(74) *Attorney, Agent, or Firm*—Arent Fox Kintner Plotkin & Kahn, PLLC

(57) ABSTRACT

In a disk device, in a state where no access to the disk is permitted, instead of permitting the head to be driven stepwise whenever step pulses are fed in, the head is inhibited from being driven stepwise until a predetermined period of time elapses after the disk starts being rotated. This helps reduce electric power consumption in such a state. Moreover, when the head has been retracted to its initial position because of an error in the stepwise driving thereof, instead of waiting for step pulses to be fed in from the host and thereby losing much time before the head is moved back to the track at which it was located before the error, the position of the head before the error is stored so that the head can be, by self recovery, moved back to the position before the error without waiting for an instruction from outside the disk device.

6 Claims, 6 Drawing Sheets

DISK DEVICE

BACKGROUND OF THE INVENTION

1. Field of the Invention

The present invention relates to a disk device, such as a floppy disk drive device, for use as an external data storage device in a computer system.

2. Description of the Prior Art

A conventional disk device will be described below, taking a floppy disk drive device (hereinafter called an FDD device) as an example. An FDD device performs read/write operations to read and write data through a magnetic head from and to a floppy disk (hereinafter called an FD), which has a plurality of tracks arranged concentrically. An FD has 81 tracks, which are identified with numbers increasing from the outermost track, called track 1, to the innermost track, called track 81. The initial position (retract position) of the magnetic head is located further outside the outermost track of the FD, and is called track 0.

During a read/write operation on the FD, whereas the magnetic head is positioned at the target track by being driven stepwise in a radial direction with respect to the FD, the FD is rotated at a constant linear speed by a spindle motor. As a result, the magnetic head scans the FD along the track.

A typical means of driving the magnetic head stepwise in a radial direction with respect to the FD is the use of a stepping motor. The operation of such a stepping motor is controlled with a direction signal and step pulses (i.e. a pulse signal for stepping) supplied from a host (CPU). Specifically, the stepping motor drives the magnetic head in the direction specified by the direction signal by so many steps as the number of step pulses. The track at which the magnetic head is currently located is detected by the use of a track counter that counts step pulses.

In the conventional FDD device, no read/write operation on the FD is permitted until a predetermined period of time $T_A$ elapses after the spindle motor starts rotating. This predetermined period of time $T_A$ is the length of time required for the rotation rate of the spindle motor to stabilize at 300 to 360 rpm (revolutions per minute), and is typically set at about $T_A$=500 milliseconds.

However, in the conventional FDD device, when step pulses are fed thereto from the host, the stepping motor is immediately driven in synchronism therewith. Thus, even while no read/write operation on the FD is permitted yet, the magnetic head is driven stepwise, with the result that the magnetic head is held at the target track for an unnecessarily long period of time. This leads to unnecessarily high consumption of electric power without any exchange of data.

Moreover, with the conventional FDD device, a mechanical shock or the like delivered thereto may cause the magnetic head to be displaced with no regard to step pulses. This leads to malfunctioning of the stepwise driving of the magnetic head and results in a seek error. In the event of a seek error, the host feeds step pulses to the FDD device to instruct it to retract the magnetic head to its initial position, i.e. track 0.

Here, if the mechanical shock or the like happens to have displaced the magnetic head outward relative to the position where it should be located, even if the magnetic head has already been retracted to track 0 by the step pulses, the output of the track counter erroneously indicates that the magnetic head has not yet been retracted to track 0. Once the FDD device gets into this state, it can no longer correctly perform the stepwise driving of the magnetic head. This state is cleared only by turning the power off once.

To avoid this inconvenience, the conventional FDD device is equipped with a reset circuit that resets the count of the track counter to 0 when the magnetic head is located at track 0 and in addition the direction signal points outward. This reset circuit makes the track at which the magnetic head is actually located coincide with the output of the track counter, and thereby prevents erroneous indication as mentioned above. After such resetting, the magnetic head is driven stepwise again according to step pulses fed thereto as a retrial instruction from the host, so that the magnetic head is moved back to the track at which it was located before the mechanical shock was delivered.

However, in the conventional FDD device, to permit the magnetic head that has been retracted to its initial position, i.e. track 0, to be moved back to the track at which it was located before a mechanical shock was delivered, it is inevitable to wait for step pulses to be fed thereto as a retrial instruction from the host, and thus recovery of the magnetic head position takes rather a long time. Moreover, on the part of the host, part of its processing power needs to be used for the recovery of the magnetic head position, and thus other operations are affected to no small extent.

SUMMARY OF THE INVENTION

An object of the present invention is to provide a disk device that saves electric power consumption by reducing the period of time for which the magnetic head is held at the target track without permission to access the disk.

Another object of the present invention is to provide a disk device that permits the magnetic head that has been retracted to its initial position because of an error in the stepwise driving thereof to be promptly moved back to the position where it was located before the error.

To achieve the above objects, according to one aspect of the present invention, in a disk device that drives a head stepwise relative to a disk, the head is inhibited from being driven stepwise until a predetermined period of time elapses after the disk starts being rotated.

According to another aspect of the present invention, in a disk device that drives a head stepwise relative to a disk, when the head is retracted to the initial position thereof on occurrence of an error in the stepwise driving thereof, the head is, by self recovery, moved back to the position where the head was located before the error without waiting for an instruction from outside.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
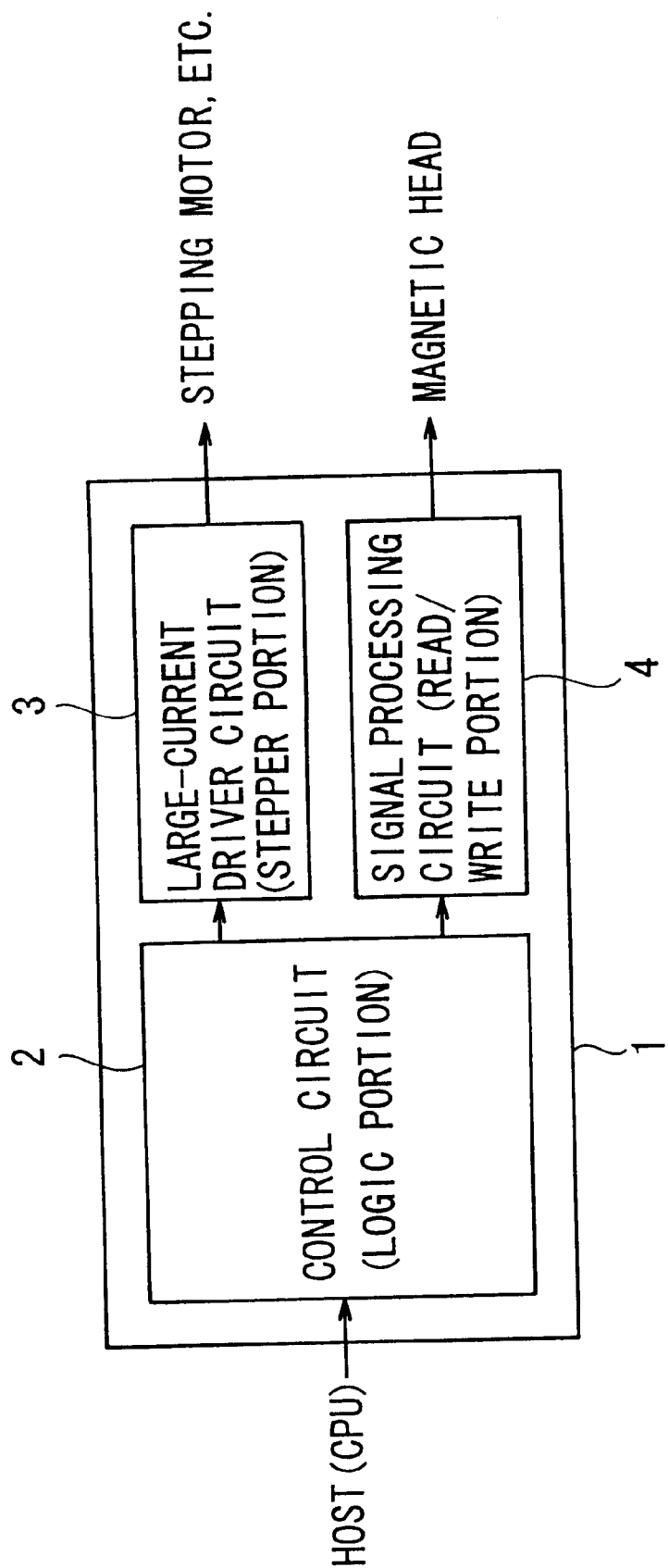
FIG. 1 is a block diagram showing the configuration of the FDD LSI employed in an FDD device embodying the invention.

Disk devices embodying the present invention will be described with reference to the drawings, taking floppy disk drive devices (hereinafter called FDD devices) as examples. In an FDD device embodying the invention, various signals obtained from a host (CPU) are processed by an LSI designed for an FDD (hereinafter called an FDD LSI) to control read/write and other operations on a floppy disk (hereinafter called an FD). FIG. 1 is a block diagram showing the configuration of the FDD LSI employed in an FDD device embodying the invention.

As shown in FIG. 1, the FDD LSI 1 is composed of a control circuit 2, a large-current driver circuit 3, and a signal processing circuit 4. The control circuit 2 is a logic portion that controls the large-current driver circuit 3 and the signal processing circuit 4 according to signals from the host (CPU). The large-current driver circuit 3 is a driver circuit for driving a stepping motor (not shown) or the like that requires a relatively large current, and functions as a stepper portion. The signal processing circuit 4 is a circuit for processing read signals for controlling the reading of data and write signals for controlling the writing of data, and functions as a read/write portion for controlling the operation of a magnetic head.

Figure 2:
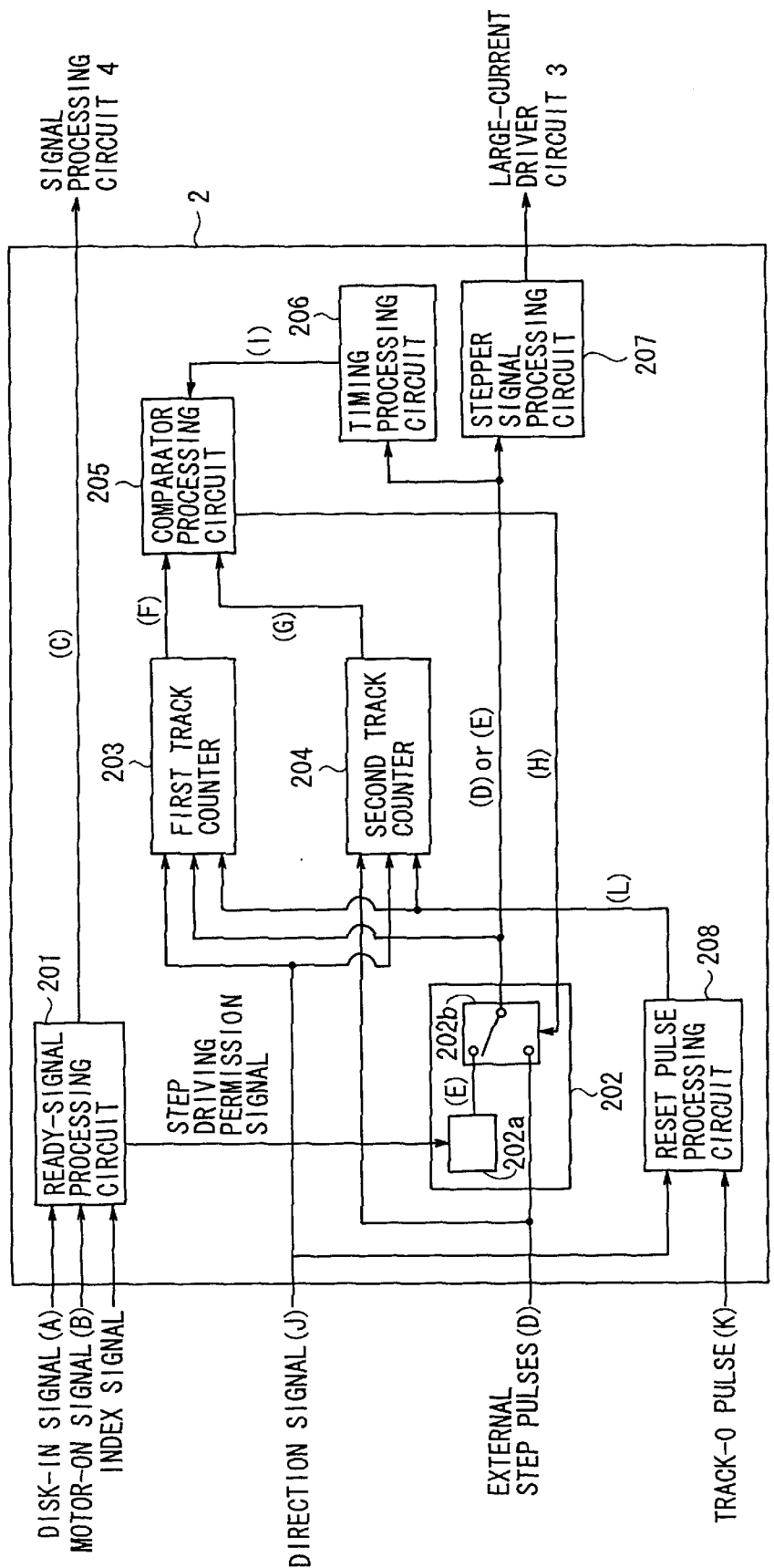
FIG. 2 is a block diagram showing the configuration of the stepper control portion of the control circuit 2 in a first embodiment of the invention.
Figure 3:
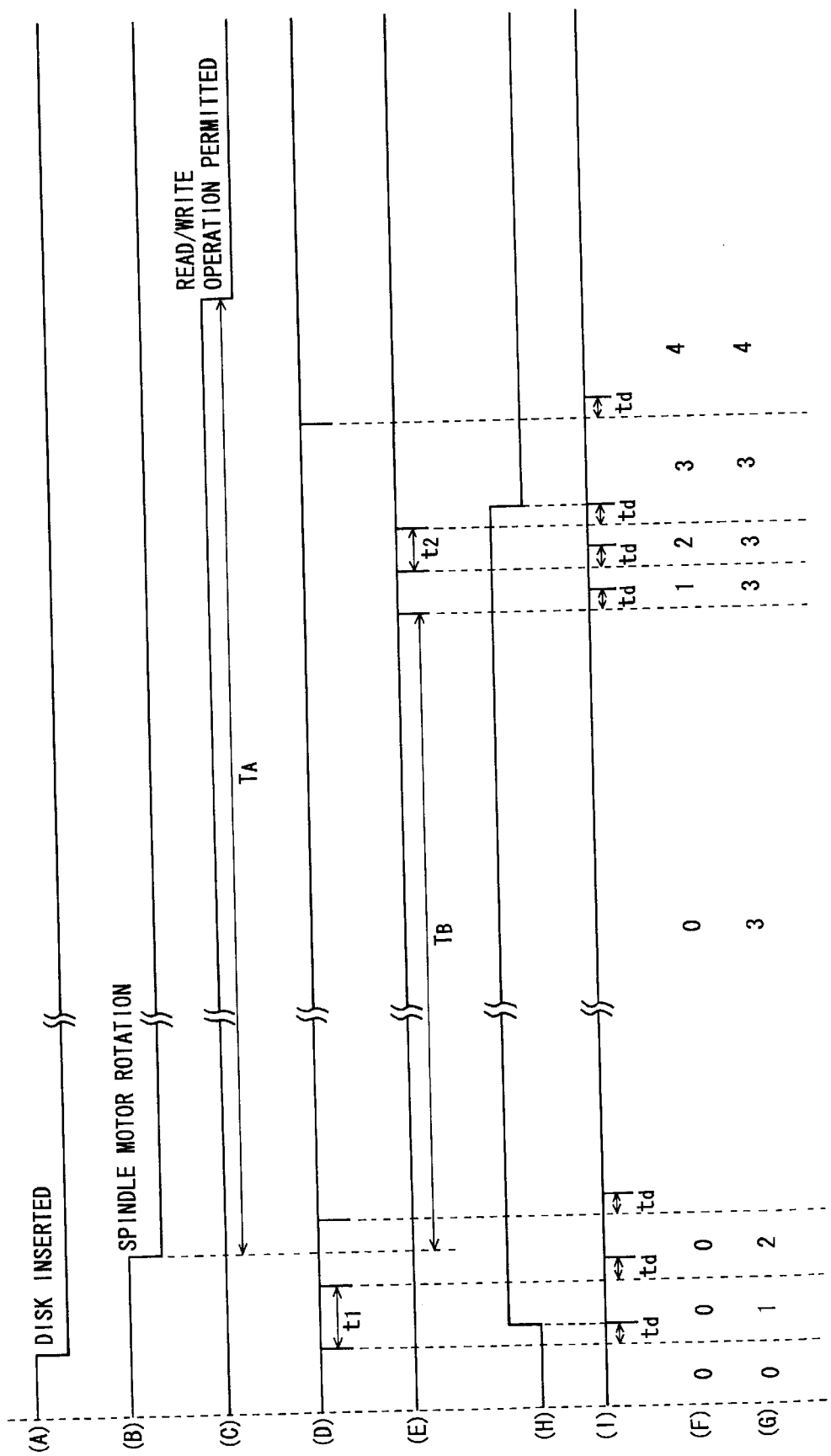
FIG. 3 is a timing chart of the buffered seek operation performed in the first embodiment.

First, the FDD device of a first embodiment of the invention will be described. FIG. 2 is a block diagram showing the configuration of the stepper control portion of the control circuit 2 in the first embodiment. FIG. 3 is a timing chart of the buffered seek operation performed in the first embodiment. As shown in FIG. 2, the stepper control portion of the control circuit 2 has a ready signal processing circuit 201, a step pulse processing circuit 202, a first track counter 203, a second track counter 204, a comparator processing circuit 205, a timing processing circuit 206, a stepper signal processing circuit 207, and a reset pulse processing circuit 208.

According to a disk-in signal (A), a motor-on signal (B), and an index signal obtained from the host (CPU), the ready signal processing circuit 201 switches the level of a ready signal (C), which is used to restrict read/write operations on the FD, between a high and a low level (hereinafter called H and L levels respectively). The disk-in signal (A) is a signal that indicates whether an FD is inserted or not, and is kept at H level when no FD is inserted and at L level when an FD is inserted. The motor-on signal (B) is a signal that indicates whether a spindle motor for rotating the FD is ON or OFF, and is kept at H level when the motor is OFF and at L level when the motor is ON. The index signal is a signal that depends on the rotation rate of the FD. The ready signal (C) is fed to the signal processing circuit 4.

As shown in FIG. 3, for the ready signal (C) to be turned to L level, i.e. for a read/write operation on the FD to be permitted, a predetermined period of time $T_A$ (typically, about 500 milliseconds) needs to elapse after the spindle motor starts rotating on insertion of an FD. However, even after the predetermined period of time $T_A$ has elapsed, if the index signal is unstable, the ready signal (C) is kept at H level until the index signal becomes stable. This is because, while the rotation rate of the spindle motor is unstable, an error is very likely in read/write operations and, in the worst case, there is even the risk of the data recorded on the FD being destroyed.

The host (CPU) feeds the control circuit 2 with external step pulses (D), a direction signal (J), and other signals on an irregular basis. These signals are needed to drive the magnetic head stepwise in a radial direction with respect to the FD. The external step pulses (D) are a signal that specifies the number of steps by which the magnetic head is to be driven. The direction signal (J) is a signal that specifies the direction in which the magnetic head is to be driven stepwise. Controlling the stepping motor according to these signals permits the magnetic head to be positioned at the target track. The external step pulses (D) are fed in at intervals $t_1$ of 3 milliseconds at the shortest, and typically about 6 milliseconds.

In the FDD device of this embodiment, instead of driving the magnetic head stepwise in synchronism with external step pulses (D) as soon as they are fed in as practiced conventionally, the magnetic head is inhibited from being driven stepwise until immediately before a read/write operation on the FD is permitted, i.e. until immediately before the ready signal (C) turns to L level.

To achieve this, external step pulses (D) from the host (CPU) are fed first to the step pulse processing circuit 202. The step pulse processing circuit 202 is composed of an internal step pulse generator 202a and a step pulse switcher 202b. The internal step pulse generator 202a generates internal step pulses (E) on its own independently of external step pulses (D). The intervals $t_2$ at which internal step pulses (E) are generated are shorter, typically 3 to 4 milliseconds, than the intervals $t_1$ at which external step pulses (D) are fed in.

The step pulse switcher 202b feeds the stepper signal processing circuit 207 with only either external step pulses (D) or internal step pulses (E). The output of the step pulse switcher 202b is delivered not only to the stepper signal processing circuit 207 but also to the first track counter 203, so that the first track counter 203 counts the current track (F) at which the magnetic head is currently located.

According to the output of the step pulse processing circuit 202, the stepper signal processing circuit 207 generates a stepper signal, and feeds it to the large-current driver circuit 3. The stepper signal is a signal that has its phase so controlled as to drive the stepping motor, which typically is a bipolar four-phase motor.

Here, to inhibit the stepwise driving of the magnetic head until immediately before a read/write operation is permitted, the step pulse processing circuit 202 inhibits the internal step pulse generator 202a from generating internal step pulses (E) until a stepwise driving permission signal is received from the ready signal processing circuit 201.

On the other hand, the step pulse switcher 202b is initially so set as to inhibit external step pulses (D) from being fed to the stepper signal processing circuit 207. Here, external step pulses (D) fed from the host (CPU) are sequentially fed not only to the step pulse processing circuit 202 but also to the second track counter 204, so that the second track counter 204 counts the target track (G) at which the magnetic head is to be positioned.

The step driving permission signal mentioned above is a signal that is produced when a predetermined period of time $T_B$ elapses after the motor-on signal (B) turns to L level. Here, to minimize unnecessary stepwise driving of the magnetic head while no exchange of data is permitted, the period of time $T_B$ should ideally be set to be as long as possible. For example, an extreme setting like $T_B=T_A$ completely eliminates unnecessary stepwise driving. However, this forces the stepwise driving of the magnetic head to be started only after a read/write operation is permitted, and thus inconveniently leads to belated access to the FD.

To avoid this, in the FDD device of this embodiment, considering that internal step pulses (E) are generated at intervals of 3 to 4 milliseconds and that the FD has 81 tracks, the predetermined period of time $T_B$ is set in the following manner. Specifically, on the basis of the value obtained by subtracting the maximum period of time required by step driving (81 tracks×4 milliseconds=324 milliseconds) from the predetermined period of time $T_A$ (≈500 milliseconds) required to permit a read/write operation, the predetermined period of time $T_B$ is set to be 200 milliseconds.

This setting makes it possible to minimize the period of time for which the magnetic head is held at the target track and in addition position the magnetic head at the target track by the time that a read/write operation is permitted. The counting of the predetermined periods of time $T_A$ and $T_B$ is achieved by means of clock counters or the like provided in the ready signal processing circuit 201.

Moreover, in the FDD device of this embodiment, the comparator processing circuit 205 compares the output of the first track counter 203 with the output of the second track counter 204 to check whether the current track (F) at which the magnetic head is currently located coincides with the target track (G) at which it is to be positioned. The comparator processing circuit 205 compares them with timing controlled by the timing processing circuit 206, and outputs a comparison result signal (H) to the step pulse switcher 202b with predetermined timing.

The comparison result signal (H) is a signal that is turned to L level when the current track (F) and the target track (G) coincide and to H level when these do not coincide. Here, the step pulse switcher 202b is controlled with the comparison result signal (H) in such a way as to output external step pulses (D) intact when the comparison result signal (H) is at L level and output internal step pulses (E) when the comparison result signal (H) is at H level. How the comparator processing circuit 205 and the timing processing circuit 206 operate will be described in detail later.

When the predetermined period of time $T_B$ has elapsed and the ready signal processing circuit 201 outputs the step driving permission signal, the internal step pulse generator 202a starts generating internal step pulses (E). On the other hand, according to the comparison result signal (H), the step pulse switcher 202b keeps outputting internal step pulses (E) to the stepper signal processing circuit 207 until the current track (F) coincides with the target track (G). In this way, a buffered seek operation permits the magnetic head to be driven stepwise to the target track. When the current track (F) coincides with the target track (G), the step pulse switcher 202b switches to ordinary seek operations in which it outputs external step pulses (D) to the stepper signal processing circuit 207.

The configuration described above is very economical, because it helps reduce the period of time for which the magnetic head is held at the target track and thereby reduce unnecessary consumption of electric power; in particular, in cases where an FDD device operates on a battery, it greatly extends the operation time of the FDD device. On the other hand, by making the intervals $t_2$ at which internal step pulses are generated shorter than the intervals $t_1$ at which external step pulses (D) are fed in, it is possible to reduce the time required by stepwise driving and thereby reduce seek noise of the FD device.

Now, the buffered seek operation mentioned above will be described specifically with reference to FIG. 3. As shown in FIG. 3, in the FDD device of this embodiment, even when external step pulses (D) starts being fed in, the magnetic head is inhibited from being driven stepwise until a predetermined period of time $T_B$ elapses. Thus, for this period, the first track counter 203 remains indicating track 0 as the current track (F). On the other hand, the second track counter 204 updates the target track (G) by incrementing it every time an external step pulse is received. Accordingly, by the time that the predetermined period of time $T_B$ has elapsed, a difference of three tracks occurs between the current track (F) and the target track (G).

Thus, when the step driving permission signal is produced after the predetermined period of time $T_B$ has elapsed, the comparator processing circuit 205 outputs a comparison result signal (H) indicating that the current track (F) does not coincide with the target track (G). On receiving this comparison result signal (H), the step pulse switcher 202b performs a buffered seek operation in which it outputs internal step pulses (E) to the stepper signal processing circuit 207 so that the magnetic head is driven stepwise to the target track (G).

Then, when so many internal step pulses (E) have been generated as to make the output of the first track counter 203 coincide with the output of the second track counter 204, the comparator processing circuit 205 outputs a comparison result signal (H) indicating that the current track (F) coincides with the target track (G). On receiving this comparison result signal (H), the step pulse switcher 202b switches to ordinary seek operations in which it outputs external step pulses (D) fed in thereafter intact to the stepper signal processing circuit 207.

Next, how the comparator processing circuit 205 and the timing processing circuit 206 operate will be described. As described previously, the comparator processing circuit 205 compares the output of the first track counter 203 with the output of the second track counter 204, and outputs a comparison result signal (H) that indicates the result of comparison. The timing with which it performs comparison is controlled by the timing processing circuit 206.

Every time an external step pulse (D) or an internal step pulse (E) is fed to the stepping motor, the timing processing circuit 206 waits for a predetermined period of time $t_d$ and then outputs a comparison trigger pulse (I). On receiving this comparison trigger pulse (I), the comparator processing circuit 205 performs comparison and outputs a comparison result signal (H).

Here, in the FDD device of this embodiment, the predetermined period of time $t_d$ is set to be 2.7 milliseconds. This value reflects the response time of the stepping motor used to drive the magnetic head stepwise. Generally, the stepping motor exhibits a response time of about 2.5 milliseconds, and thus it cannot respond to a step pulse that is fed thereto at an interval shorter than that. For this reason, if comparison is started as soon as a step pulse appears, when an external step pulse (D) is fed in immediately after the current track (F) coincides with the target track (G) (within 2.5 milliseconds), that external step pulse (D) is not accepted by the stepping motor, and a seek error results.

To avoid this, in the FDD device of this embodiment, every time an external step pulse (D) or an internal step pulse (E) is fed to the stepping motor, only after the predetermined period of time $t_d$ has elapsed is the output of the first track counter 203 compared with the output of the second track counter 204. This permits the buffered seek operation to be continued even when an external step pulse (D) is fed in immediately after the current track (F) coincides with the target track (G), and thereby prevents a seek error. This helps improve the error rate characteristic of the FDD device.

Figure 4:
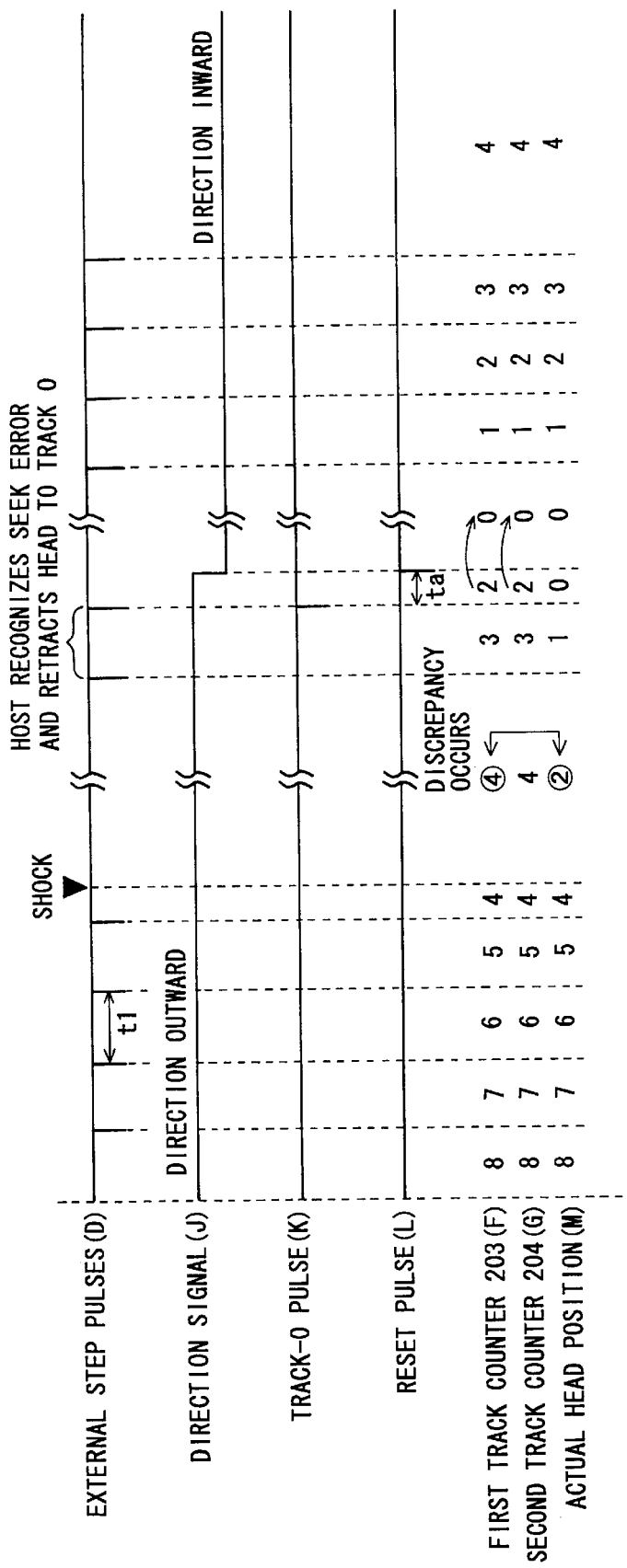
FIG. 4 is a timing chart of the track counter reset operation performed in the first embodiment.

Furthermore, in the FDD device of this embodiment, the reset pulse processing circuit 208 serves to enhance shock resistance. FIG. 4 is a timing chart of the track counter reset operation performed in the first embodiment. When a mechanical shock is delivered to the FDD device, the magnetic head may be displaced with no regard to step pulses, causing the current track (F) output from the first track counter 203 to differ from the track (M) at which the magnetic head is actually located. On the basis of data read from the FD, the host recognizes this state as a seek error, and outputs external step pulses (D) to the control circuit 2 to retract the magnetic head to its initial position (track 0).

At this point, if the mechanical shock happens to have displaced the magnetic head outward relative to the track where it should be located, even if the magnetic head has already been retracted to track 0 by external step pulses (D), the outputs of the first and second track counters 203 and 204 erroneously indicate that the magnetic head has not yet been retracted to track 0. Once the FDD device gets into this state, it can no longer correctly perform the stepwise driving of the magnetic head. This state is cleared only by turning the power off once.

To overcome this inconvenience, the host, on recognizing that the track (M) at which the magnetic head is actually located has reached its initial position (track 0), feeds the reset pulse processing circuit 208 with a track-0 pulse (K). On receiving the track-0 pulse (K), the reset pulse processing circuit 208 checks the direction indicated by the direction signal (J), and, if the direction signal (J) is found to be still pointing outward with respect to the FD, waits for a predetermined period of time $t_a$ ($t_a<t_1$), and then feeds the first and second track counters 203 and 204 simultaneously with a reset pulse (L).

As a result, the counts of the first and second track counters 203 and 204 are simultaneously reset to 0, making the current track (F) output from the first track counter 203, the target track (G) output from the second track counter 204, and the track (M) at which the magnetic head is actually located all coincide. In this embodiment, the predetermined period of time $t_a$ is set to be shorter than the intervals $t_1$ at which external step pulses (D) are fed in (for example, $t_a$=2.5 milliseconds), and this prevents external step pulses from being fed in continuously even after the magnetic head has been retracted to track 0.

On the other hand, on detecting the reset pulse (L), the host switches the direction signal (J) to make it point inward, and starts outputting step pulses (D) again to move the magnetic head back to the track at which it was located before the mechanical shock was delivered. The configuration described above permits the FDD device a prompt recovery to a state in which it can retry a seek operation in the event of a seek error resulting from a mechanical shock delivered thereto.

Figure 5:
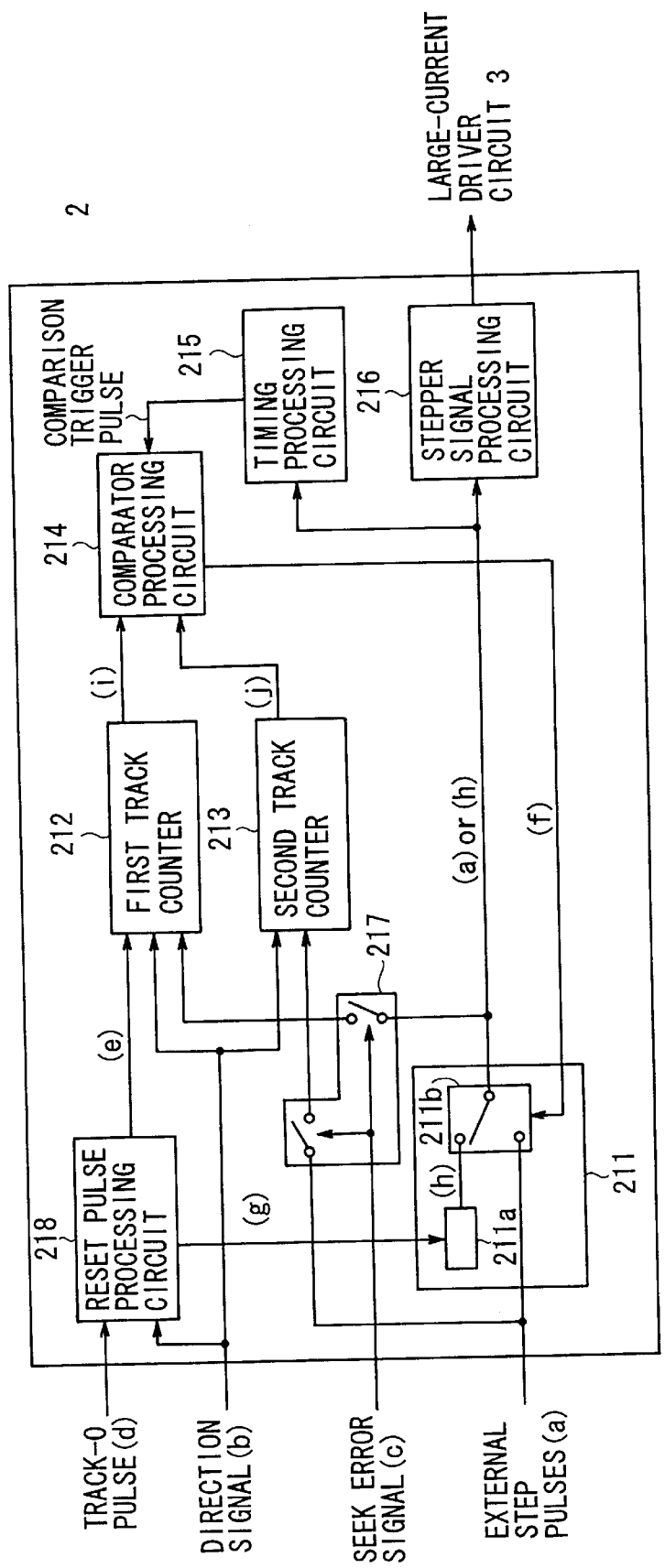
FIG. 5 is a block diagram showing the configuration of the stepper control portion of the control circuit 2 in a second embodiment of the invention.

Next, the FDD device of a second embodiment of the invention will be described. FIG. 5 is a block diagram showing the configuration of the stepper control portion of the control circuit 2 in the second embodiment. In the FDD device of this embodiment, the magnetic head that has retracted to its initial position because of an error in the stepwise driving thereof is, by self recovery, moved back to the track at which it was before the error without waiting for step pulses from the host. To achieve this, the stepper control portion of the control circuit 2 is provided with a step pulse processing circuit 211, a first track counter 212, a second track counter 213, a comparator processing circuit 214, a timing processing circuit 215, a stepper signal processing circuit 216, a step pulse shut-off circuit 217, and a reset pulse processing circuit 218.

The host feeds the control circuit 2 with external step pulses (a), a direction signal (b), and other signals on an irregular basis. These signals are needed to drive the magnetic head stepwise in a radial direction with respect to the FD. The external step pulses (a) are a signal that specifies the number of steps by which the magnetic head is to be driven. The direction signal (b) is a signal that specifies the direction in which the magnetic head is to be driven stepwise. Controlling the stepping motor according to these signals permits the magnetic head to be positioned at the target track. The external step pulses (a) are fed in at intervals $t_1$ of 3 millisecond at the shortest, and typically about 6 milliseconds.

The external step pulses (a) from the host are fed first to the step pulse processing circuit 211. The step pulse processing circuit 211 is composed of an internal step pulse generator 211a and a step pulse switcher 211b. The internal step pulse generator 211a generates internal step pulses (h) on its own independently of external step pulses (a). The intervals $t_2$ at which internal step pulses (h) are generated are shorter, typically 3 to 4 milliseconds, than the intervals $t_1$ at which external step pulses (a) are fed in.

The step pulse switcher 211b feeds the stepper signal processing circuit 216 with only either external step pulses (a) or internal step pulses (h). The output of the step pulse switcher 211b is delivered not only to the stepper signal processing circuit 216 but also to the first track counter 212, so that the first track counter 212 counts the current track (i) at which the magnetic head is currently located.

According to the output of the step pulse processing circuit 211, the stepper signal processing circuit 216 generates a stepper signal, and feeds it to the large-current driver circuit 3. The stepper signal is a signal that has its phase so controlled as to drive the stepping motor, which typically is a bipolar four-phase motor.

On the other hand, external step pulses (a) from the host are sequentially fed not only to the step pulse processing circuit 211 but also to the second track counter 213, so that the second track counter 213 counts the target track (j) at which the magnetic head is to be positioned.

Moreover, in the FDD device of this embodiment, the comparator processing circuit 214 compares the output of the first track counter 212 with the output of the second track counter 213 to check whether the current track (i) at which the magnetic head is currently located coincides with the target track (j) at which it is to be positioned. The comparator processing circuit 214 outputs a comparison result signal (f), which is a signal that is turned to L level when the current track (i) and the target track (j) coincide and to H level when these do not coincide. The step pulse switcher 211b is so controlled as to output external step pulses (a) intact when the comparison result signal (f) is at L level and output internal step pulses (h) when the comparison result signal (f) is at H level.

Here, the timing with which the comparator processing circuit 214 performs comparison is controlled by the timing processing circuit 215. Every time an external step pulse (a) or an internal step pulse (h) is fed to the stepping motor, the timing processing circuit 215 waits for a predetermined period of time $t_d$ and then outputs a comparison trigger pulse. On receiving this comparison trigger pulse, the comparator processing circuit 214 performs comparison and outputs a comparison result signal (f).

In the FDD device of this embodiment, the predetermined period of time $t_d$ is set to be 2.7 milliseconds. This value reflects the response time of the stepping motor used to drive the magnetic head stepwise. Generally, the stepping motor exhibits a response time of about 2.5 milliseconds, and thus it cannot respond to a step pulse that is fed thereto at an interval shorter than that. For this reason, if comparison is started as soon as a step pulse appears, when an external step pulse (a) is fed in immediately after the current track (i) coincides with the target track (j) (within 2.5 milliseconds), that external step pulse (a) is not accepted by the stepping motor, and a seek error results.

To avoid this, in the FDD device of this embodiment, every time an external step pulse (a) or an internal step pulse (h) is fed to the stepping motor, only after the predetermined period of time $t_d$ has elapsed is the output of the first track counter 212 compared with the output of the second track counter 213. This permits internal step pulses (h) to be continuously output even when an external step pulse (a) is fed in immediately after the current track (i) coincides with the target track (j), and thereby prevents a seek error.

Furthermore, in the FDD device of this embodiment, the step pulse shut-off circuit 217 and the reset pulse processing circuit 218 operate as follows. The step pulse shut-off circuit 217, on receiving a seek error signal (c) fed from the host, shuts off input of external step pulses to the first and second track counters 212 and 213.

The reset pulse processing circuit 218, when the magnetic head is located at its initial position, i.e. track 0, and in addition the direction signal (b) points outward, feeds the first track counter 212 with a reset pulse (e) to reset its count to 0, and also feeds the internal step pulse generator 211a with a step permission pulse (g) that instructs it to start generating internal step pulses (h).

Figure 6:
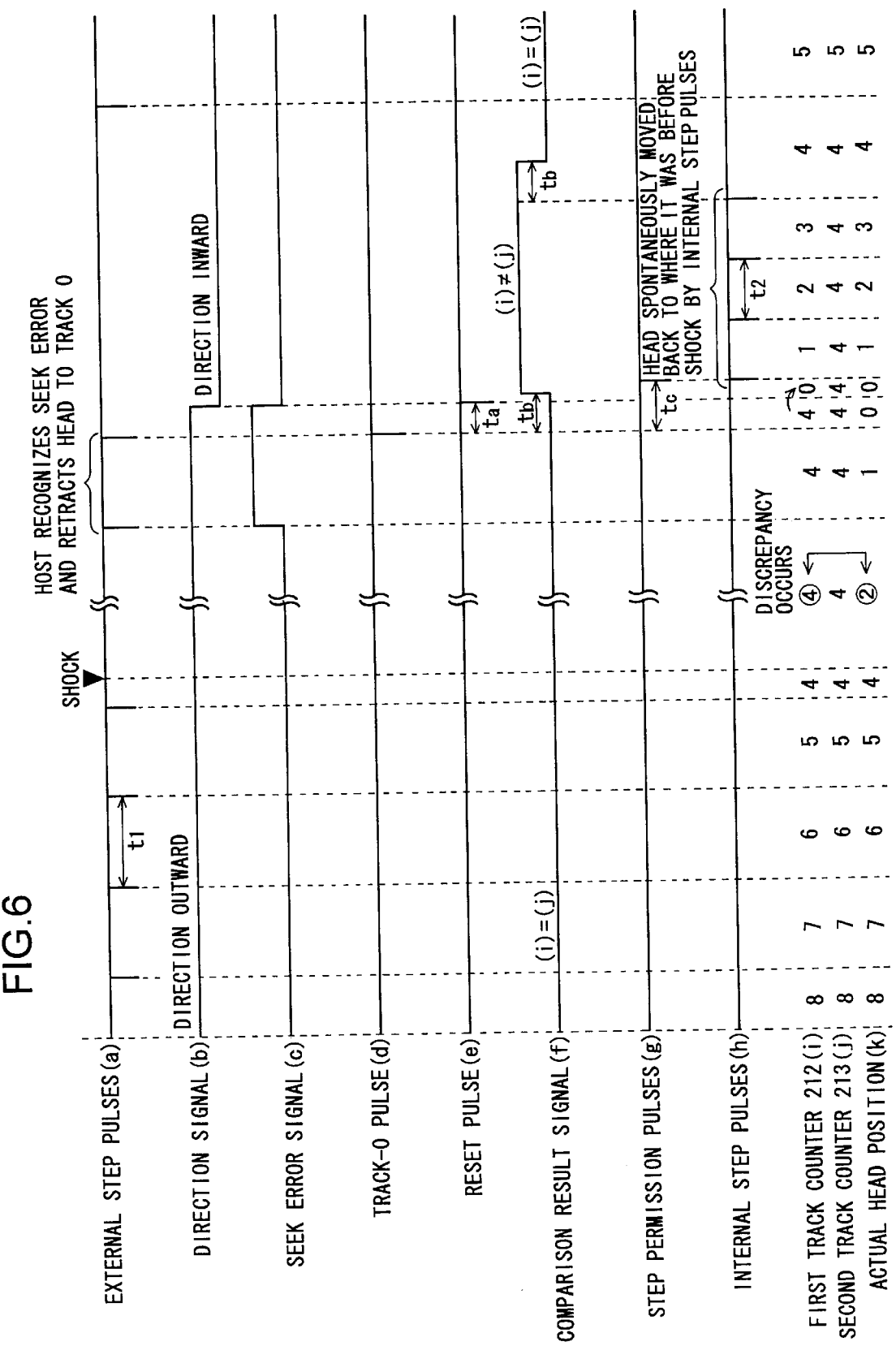
FIG. 6 is a timing chart of the track counter reset operation performed in the second embodiment.

Now, the self recovery operation performed when a seek error occurs in the FDD device of this embodiment will be described in detail. FIG. 6 is a timing chart of the track counter reset operation performed in the second embodiment. When a mechanical shock or the like is delivered to the FDD device, the magnetic head may be displaced with no regard to step pulses, causing the current track (i) output from the first track counter 212 to differ from the track (k) at which the magnetic head is actually located. On the basis of data read from the FD, the host recognizes this state as a seek error, and outputs external step pulses (a) to the step pulse processing circuit 211 to retract the magnetic head to its initial position (track 0). Simultaneously, the host turns the seek error signal (c) fed to the step pulse shut-off circuit 217 from L level to H level.

The seek error signal (c) is normally kept at L level, but is turned to H level as soon as the magnetic head starts being retracted to its initial position (track 0) after the host has recognized occurrence of a seek error. When the seek error signal (c) is at H level, the step pulse shut-off circuit 217 opens its circuit so that input of external step pulses (a) to the first and second track counters 212 and 213 is shut off. This configuration permits the track (in this example, track 4) at which the magnetic head was located before the delivery of the mechanical shock to be stored in the second track counter 213.

Here, the purpose of shutting off also the input of external step pulses (a) to the first track counter 212 is to keep the output (i) of the first track counter 212 coinciding with the output (j) of the second track counter 213. This causes the comparison result signal (f) output from the comparator processing circuit 214 to be kept at L level, and thus the step pulse switcher 211b keeps outputting external step pulses (a) to the stepper signal processing circuit 216. By inhibiting the comparison operation of the comparator processing circuit 214 when the seek error signal (c) is at H level, it is possible to dispense with shutting off the input of external step pulses (a) to the first track counter 212.

The host, on recognizing that the track (k) at which the magnetic head is actually located has reached its initial position (track 0), feeds the reset pulse processing circuit 218 with a track-0 pulse (d). The reset pulse processing circuit 218 has a clock counter so that, when a predetermined period of time $t_a$ ($t_a < t_1$) elapses after it has received the track-0 pulse (d), feeds the first track counter 212 with a reset pulse (e). This resets the count of the first track counter 212 to 0, making the current track (i) output from the first track counter 212 coincide with the track (k) at which the magnetic head is actually located.

Here, the predetermined period of time $t_a$ is set to be shorter than the predetermined period of time $t_b$ (for example, $t_a$=2.5 milliseconds), and therefore the outputs (i) and (j) of the first and second track counters 212 and 213 are compared after the count of the first track counter 212 has been reset. This causes the output (i) of the first track counter 212 to differ from the output (j) of the second track counter 213, and thus the comparison result signal (f) turns to H level. As a result, the step pulse switcher 211b is so switched as to output internal step pulses (h) to the stepper signal processing circuit 216.

On the other hand, on detecting the reset pulse (e), the host switches the direction signal (b) to make it point inward, and turns the seek error signal (c) back to L level. Thus, the step pulse shut-off circuit 217 closes its circuit so as to permit input of step pulses to the first and second track counters 212 and 213. As a result, external step pulses (a) or internal step pulses (h) appearing thereafter are counted normally.

Moreover, the reset pulse processing circuit 218, when a predetermined time $t_c$ ($t_c > t_b$) elapses after it has received the track-0 pulse (d), feeds the internal step pulse generator 211a with a step permission pulse (g). This causes the internal step pulse generator 211a to start generating internal step pulses (h), and thus a buffered seek operation is started to move the magnetic head back to the track at which it was located before the mechanical shock was delivered. As described previously, by setting the intervals $t_2$ at which internal step pulses (h) are generated to be shorter than the intervals at which external step pulses (a) are fed in, it is possible to reduce the time required for the recovery of the magnetic head position, and also to reduce the noise produced during the recovery.

It is advisable that the predetermined time $t_c$ be somewhat longer than the predetermined time $t_b$ (for example, $t_c$=3.0 milliseconds). This setting permits the above-mentioned buffered seek operation to be started immediately after the step pulse switcher 211b switches to outputting internal step pulses (h), and thus permits prompt starting of self recovery.

Meanwhile, the second track counter 213 receives no input at all, and thus keeps storing the track at which the magnetic head was located before the mechanical shock was delivered. When the magnetic head is moved, by internal step pulses (h), back to the track at which it was previously located, and the outputs (i) and (j) of the first and second track counters 212 and 213 coincide, the comparison result signal (f) turns back to L level. Thus, the step pulse switcher 211b stop outputting internal step pulses (h) and switches to outputting external step pulses (a) to the stepper signal processing circuit 216. This is the end of the self recovery operation performed to move the magnetic head back to the track at which it was previously located.

In the embodiments described above, FDD devices are taken as examples. However, the present invention can be applied not only to FDD devices but to a variety of devices that achieve access to a disk by driving a head stepwise.

What is claimed is:

1. A disk device comprising:

a disk rotating mechanism for rotating a disk;

a head driven stepwise with pulses;

an internal pulse generator for generating internal pulses;

a switcher that outputs either external pulses supplied from outside or the internal pulses;

an inhibition circuit for inhibiting the internal pulses from being generated until a predetermined period of time elapses after the disk starts being rotated; and a controller for controlling the switcher in such a way that, after the predetermined period of time has elapsed, the head is driven stepwise to a target position with the internal pulses and thereafter the head is driven stepwise with the external pulses, wherein the predetermined period of time is set on a basis of a value obtained by subtracting a maximum time required for stepwise driving from a predetermined period of time required for read/write operation to become possible.

2. A disk device as claimed in claim 1, wherein the internal pulses are generated at shorter intervals than the external pulses are supplied.

3. A disk device as claimed in claim 1, further comprising:

a first counter for counting the pulses output from the switcher;

a second counter for counting the external pulses; and a comparator for comparing an output of the first counter with an output of the second counter, wherein, after the predetermined period of time has elapsed, the switcher outputs the internal pulses when the comparator yields a result indicating discrepancy and the switcher outputs the external pulses when the comparator yields a result indicating coincidence.

4. A disk device as claimed in claim 3, wherein the comparator compares the output of the first counter with the output of the second counter after waiting for a predetermined period of time every time the switcher outputs a pulse irrespective of whether the pulse is one of the external or internal pulses.

5. A disk device as claimed in claim 3, wherein, when an error occurs in stepwise driving of the head, the first and second counters are reset simultaneously.

6. A disk device comprising:

a disk rotating mechanism for rotating a disk;

a head driven stepwise with pulses;

an internal pulse generator for generating internal pulses;

a switcher that outputs either external pulses supplied from outside or the internal pulses;

a first counter for counting the pulses output from the switcher;

a second counter for counting the external pulses;

a comparator for comparing an output of the first counter with an output of the second counter;

a controller for controlling the switcher in such a way that the switcher outputs the internal pulses when the comparator yields a result indicating discrepancy and that the switcher outputs the external pulses when the comparator yields a result indicating coincidence;

an inhibition circuit for inhibiting input to the first and second counters; and a reset circuit for resetting the first counter, wherein, while the head is being retracted to an initial position thereof, input to the first and second counters is inhibited, and, as soon as the head reaches the initial position, only the first counter is reset.

* * * * *